United States Patent
Fukukawa et al.

(10) Patent No.: US 12,371,017 B2
(45) Date of Patent: Jul. 29, 2025

(54) VEHICLE CONTROLLER AND VEHICLE CONTROL METHOD

(71) Applicants: ADVICS CO., LTD., Kariya (JP); TOYOTA JIDOSHA KABUSHIKI KAISHA, Toyota (JP)

(72) Inventors: Shogi Fukukawa, Tokyo (JP); Michihiro Otsubo, Tokyo (JP); Akitsugu Sakai, Toyota (JP); Kazuki Miyake, Okazaki (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 17/942,400

(22) Filed: Sep. 12, 2022

(65) Prior Publication Data

US 2023/0090665 A1 Mar. 23, 2023

(30) Foreign Application Priority Data

Sep. 17, 2021 (JP) .................................. 2021-151873

(51) Int. Cl.
- *B60W 30/14* (2006.01)
- *B60W 40/076* (2012.01)
- *B60W 40/10* (2012.01)
- *B60W 50/00* (2006.01)

(52) U.S. Cl.
CPC ........ B60W 30/143 (2013.01); B60W 40/076 (2013.01); B60W 40/1005 (2013.01);
(Continued)

(58) Field of Classification Search
CPC ............. B60W 30/143; B60W 40/076; B60W 40/1005; B60W 50/0098;
(Continued)

(56) References Cited

U.S. PATENT DOCUMENTS

2018/0224851 A1* 8/2018 Park ..................... G05D 1/0088
2020/0156480 A1 5/2020 Park et al.
(Continued)

FOREIGN PATENT DOCUMENTS

| CN | 110435623 B | 5/2020 |
| JP | 2000-306200 A | 11/2000 |

(Continued)

OTHER PUBLICATIONS

Office Action (Notice of Reasons for Refusal) issued Sep. 5, 2023, by the Japan Patent Office in corresponding Japanese Patent Application No. 2021-151873 and an English Translation of the Office Action. (8 pages).

(Continued)

*Primary Examiner* — Anne Marie Antonucci
*Assistant Examiner* — Luis G Del Valle
(74) *Attorney, Agent, or Firm* — BUCHANAN INGERSOLL & ROONEY PC (57) ABSTRACT

A travel controller executes a first correction process on a request value when the vehicle is traveling on an uphill road, and executes a second correction process on the request value when the vehicle is traveling on a downhill road. The first correction process corrects the request value such that the traveling speed is higher than that in a case in which the first correction process is not executed. The second correction process corrects the request value such that the traveling speed is lower than that in a case in which the second correction process is not executed. If hard braking of the vehicle is requested during execution of the first correction process, the travel controller sets a correction amount of the request value to a lower value than that in a case in which hard braking of the vehicle is not requested.

4 Claims, 5 Drawing Sheets

(52) U.S. Cl.
CPC . *B60W 50/0098* (2013.01); *B60W 2050/0012* (2013.01); *B60W 2530/16* (2013.01); *B60W 2552/15* (2020.02)

(58) Field of Classification Search
CPC ..... B60W 2050/0012; B60W 2530/16; B60W 2552/15; B60W 2520/105; B60W 2710/0666; B60W 2710/083; B60W 2720/30; B60W 2520/10; B60W 2710/182; B60W 2720/10; B60W 10/184; B60W 10/04; B60Y 2300/181
See application file for complete search history.

(56) References Cited

U.S. PATENT DOCUMENTS

| | | | | |
|---|---|---|---|---|
| 2020/0231153 | A1* | 7/2020 | Yokota | B60T 7/122 |
| 2022/0063604 | A1* | 3/2022 | Okano | G06V 20/58 |
| 2022/0089036 | A1* | 3/2022 | Son | B60W 50/0097 |
| 2022/0135044 | A1* | 5/2022 | Jang | B60W 50/0098 701/41 |
| 2023/0001926 | A1* | 1/2023 | Ito | B60W 30/16 |
| 2024/0077510 | A1* | 3/2024 | Lin | G06N 5/022 |

FOREIGN PATENT DOCUMENTS

| | | |
|---|---|---|
| JP | 2005-202579 A | 7/2005 |
| JP | 2007-248160 A | 9/2007 |
| JP | 2019098972 A | 6/2019 |

OTHER PUBLICATIONS

The extended European Search Report issued Feb. 3, 2023, by the European Patent Office in corresponding European Patent Application No. 22188700.3-1012. (9 pages).

* cited by examiner

VEHICLE CONTROLLER AND VEHICLE CONTROL METHOD

BACKGROUND

1. Field

The present disclosure relates to a vehicle controller and a vehicle control method.

2. Description of Related Art

Japanese Laid-Open Patent Publication No. 2019-98972 discloses a vehicle equipped with a driving device, which produces a driving force, a braking device, which produces a braking force, and an autonomous driving controller that executes an autonomous driving control. The autonomous driving controller calculates a feedback correction amount based on a deviation between a target acceleration of a vehicle and an actual acceleration of the vehicle, and a feedforward correction amount based on, for example, a road surface gradient. The autonomous driving controller controls the driving device and the braking device based on the feedback correction amount and the feedforward correction amount. Thus, even if the gradient of the road on which the vehicle is traveling changes, the autonomous driving controller can allow the vehicle actual acceleration to follow the target acceleration.

When the traveling speed of a vehicle is controlled automatically as in the above-described autonomous driving control, braking is requested to avoid collision with obstacles in some cases. In such a case, the vehicle is preferably stopped at an early stage.

SUMMARY

In one general aspect, a vehicle controller automatically controls a traveling speed of a vehicle based on a request value provided by a driver assistance device. The vehicle controller includes a correction unit. When the vehicle is traveling on an uphill road, the correction unit executes a first correction process on the request value. When the vehicle is traveling on a downhill road, the correction unit executes a second correction process on the request value. The first correction process is a process that corrects the request value such that the traveling speed is higher than that in a case in which the first correction process is not executed. The second correction process is a process that corrects the request value such that the traveling speed is lower than that in a case in which the second correction process is not executed. If hard braking of the vehicle is requested by the driver assistance device when the first correction process is being executed, the correction unit sets a correction amount of the request value in the first correction process to a lower value than that in a case in which hard braking of the vehicle is not requested.

In another general aspect, a vehicle control method automatically controls a traveling speed of a vehicle based on a request value provided by a driver assistance device. The method includes: when the vehicle is traveling on an uphill road, executing a first correction process on the request value; and when the vehicle is traveling on a downhill road, executing a second correction process on the request value. The first correction process is a process that corrects the request value such that the traveling speed is higher than that in a case in which the first correction process is not executed. The second correction process is a process that corrects the request value such that the traveling speed is lower than that in a case in which the second correction process is not executed. The first correction process includes a process that, if hard braking of the vehicle is requested by the driver assistance device, sets a correction amount of the request value to a lower value than that in a case in which hard braking of the vehicle is not requested.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller according to one embodiment will now be described with reference to the drawings. The vehicle controller is a travel controller 100 in the present embodiment. In the present embodiment, the travel controller 100 is mounted on a vehicle 10, which is a battery electric vehicle.

<Vehicle 10>

Figure 1:
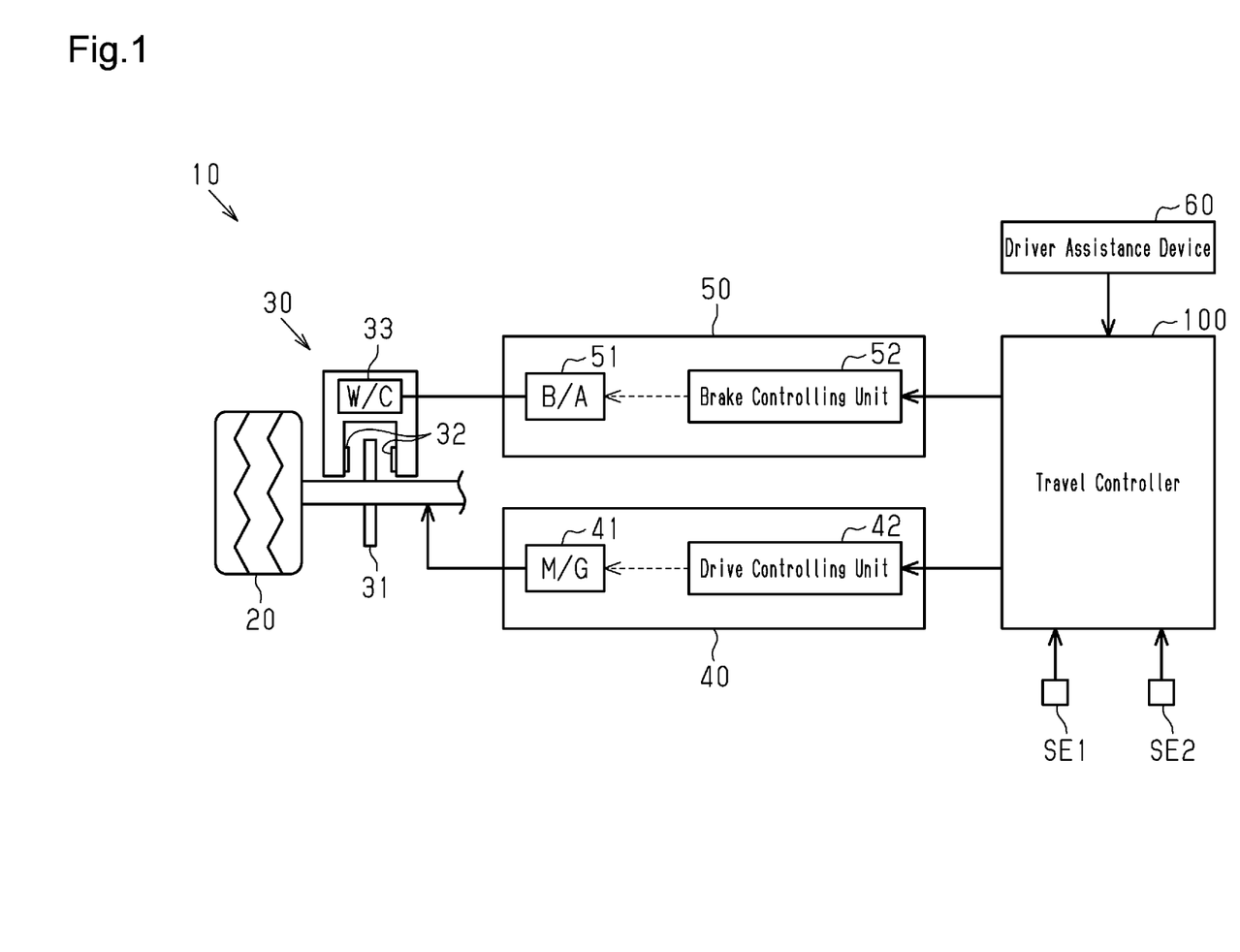
FIG. 1 is a schematic diagram showing a configuration of a vehicle equipped with a travel controller.

As shown in FIG. 1, the vehicle 10 includes wheels 20, braking mechanisms 30, a driving device 40, a braking device 50, a driver assistance device 60, the travel controller 100, a wheel speed sensor SE1, and a longitudinal acceleration sensor SE2. Some of the components of the vehicle 10 are omitted from FIG. 1.

<Braking Mechanism 30>

Each braking mechanism 30 includes a rotor 31, which rotates integrally with the associated wheel 20, frictional members 32, which do not rotate integrally with the wheel 20, and a wheel cylinder 33, which displaces the frictional members 32 toward the rotor 31 in accordance with a hydraulic pressure.

As the hydraulic pressure of the wheel cylinder 33 increases, the braking mechanism 30 presses the frictional members 32 to the rotor 31 with a greater force. As the force with which the frictional members 32 are pressed against the rotor 31 increases, the braking mechanism 30 applies a greater frictional braking force Fbf to the wheel 20. The braking mechanisms 30 are provided for the respective wheels 20. For example, if the vehicle 10 is a four-wheel vehicle, the vehicle 10 is equipped with four wheels 20 and four braking mechanisms 30.

<Driving Device 40>

The driving device 40 includes a motor-generator 41 and a drive controlling unit 42, which controls the motor-generator 41.

When the motor-generator 41 functions as an electric motor, the motor-generator 41 applies, to each wheel 20, a driving force Fd for causing the vehicle 10 to travel. In this case, the motor-generator 41 functions as a drive source of the vehicle 10. The drive controlling unit 42 causes the motor-generator 41 to generate the driving force Fd based on a request driving force Fdq requested by the travel controller 100. For example, if the vehicle 10 is a four-wheel vehicle, the vehicle 10 preferably includes a motor-generator for the front wheels and a motor-generator for the rear wheels.

<Braking Device 50>

The braking device 50 includes a brake actuator 51, which adjusts a hydraulic pressure of the wheel cylinder 33, and a brake controlling unit 52, which controls the brake actuator 51.

The brake actuator 51 adjusts the amount of brake fluid supplied to the wheel cylinder 33 so as to adjust the hydraulic pressure of the wheel cylinder 33. The brake actuator 51 is preferably capable of adjusting the hydraulic pressure of each of wheel cylinders 33 that respectively correspond to the wheels 20. The brake controlling unit 52 causes the brake actuator 51 to generate the frictional braking force Fbf based on the request braking force Fbq requested by the travel controller 100.

<Driver Assistance Device 60>

Figure 2:
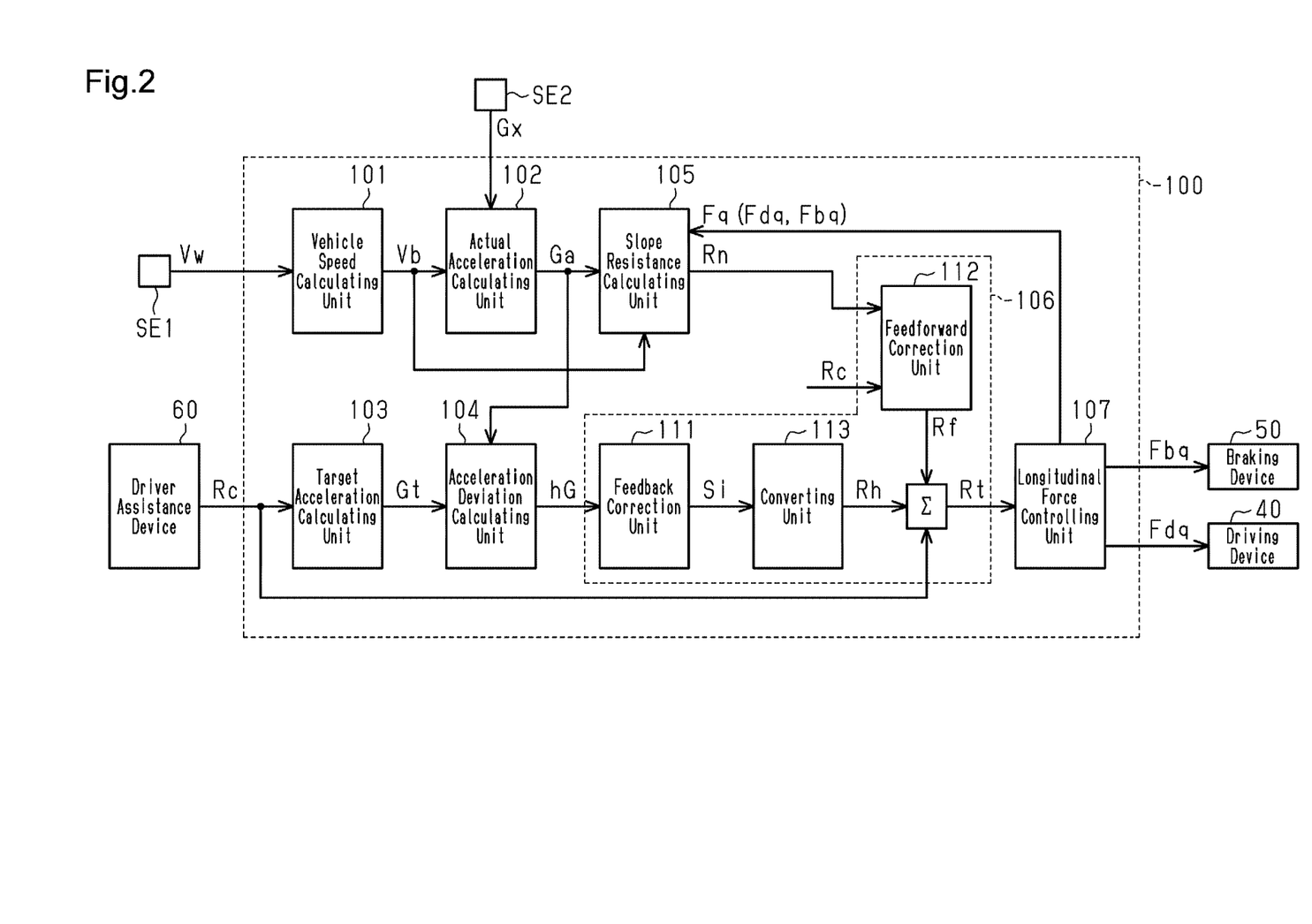
FIG. 2 is a block diagram of the travel controller shown in FIG. 1.

The driver assistance device 60 executes, as a driver assistance function, an autonomous driving control that causes the vehicle 10 to travel autonomously. As shown in FIGS. 1 and 2, the driver assistance device 60 calculates a request value Rc used in the autonomous driving control based on various types of driving information. In the present embodiment, the request value Rc is a request value for a longitudinal force that indicates a force that acts in the longitudinal direction of the vehicle 10. When having a positive value, the request value Rc indicates that the driver assistance device 60 is requesting acceleration of the vehicle 10. When having a negative value, the request value Rc indicates that the driver assistance device 60 is requesting deceleration of the vehicle 10. Also, the driving information includes, for example, information related to the position of the vehicle 10, information related to the environment of the vehicle 10, and information related to the traveling state of the vehicle 10.

The driver assistance device 60 has other driver assistance functions in addition to the autonomous driving control. Other driver assistance functions include emergency braking. The emergency braking is a function that requests braking of the vehicle 10 in order to avoid collision with obstacles such as a pedestrian or other vehicles in front of the vehicle 10. In the present disclosure, braking by the braking device 50 includes hard braking, in which the braking force Fb of the vehicle 10 that the driver assistance device 60 requests the travel controller 100 to produce exceeds a specified determination value. The hard braking includes braking that is performed to avoid collision with an obstacle when the emergency braking is performed.

<Travel Controller 100>

As shown in FIG. 2, the travel controller 100 includes a vehicle speed calculating unit 101, an actual acceleration calculating unit 102, a target acceleration calculating unit 103, an acceleration deviation calculating unit 104, a slope resistance calculating unit 105, a correction unit 106, and a longitudinal force controlling unit 107. The travel controller 100 controls the driving device 40 and the braking device 50 based on the request value Rc from the driver assistance device 60, thereby automatically adjusting the traveling speed of the vehicle 10. In the following description, the traveling speed of the vehicle 10 will be referred to as a vehicle speed Vb in some cases.

The vehicle speed calculating unit 101 calculates a wheel speed Vw based on a detection result of the wheel speed sensor SE1. The vehicle speed calculating unit 101 calculates the vehicle speed Vb of the vehicle 10 based on the wheel speed Vw.

Figure 3:
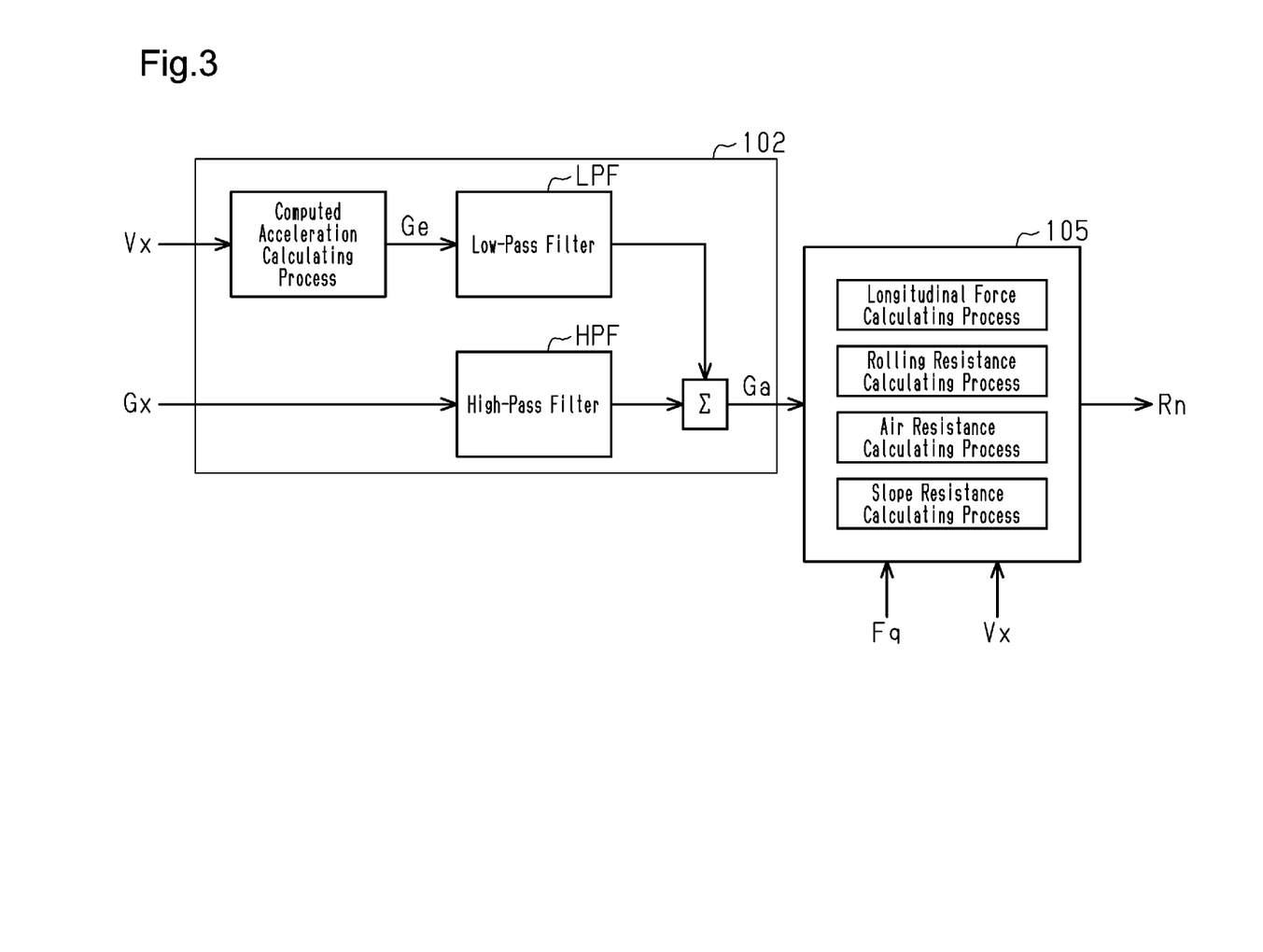
FIG. 3 is a block diagram of an actual acceleration calculating unit and a slope resistance calculating unit of the travel controller shown in FIG. 2.

As shown in FIG. 3, the actual acceleration calculating unit 102 calculates an actual acceleration Ga of the vehicle 10. The actual acceleration calculating unit 102 then performs differentiation of the vehicle speed Vb, which has been calculated by the vehicle speed calculating unit 101, thereby executing a computed acceleration calculating process, which calculates an acceleration. The acceleration obtained through this calculating process is referred to as a computed acceleration Ge. When the wheel speed Vw changes significantly in a short time, such as, when the wheel 20 slips, the computed acceleration Ge is likely to deviate from the actual acceleration of the vehicle 10. In this regard, the actual acceleration calculating unit 102 causes the computed acceleration Ge to pass through a low-pass filter LPF, thereby extracting only a low-frequency component from the computed acceleration Ge.

The actual acceleration calculating unit 102 obtains an acceleration based on a detection result of the longitudinal acceleration sensor SE2. The acceleration obtained through this process is referred to as a detected acceleration Gx. When the vehicle 10 is on a sloped road, the longitudinal acceleration sensor SE2 is tilted with respect to the horizontal direction, so that the output value of the longitudinal acceleration sensor SE2 is offset by a value corresponding to the gradient of the road surface. In this regard, the actual acceleration calculating unit 102 causes the computed acceleration Ge to pass through a high-pass filter HPF, thereby extracting only a high-frequency component from the detected acceleration Gx.

The actual acceleration calculating unit 102 calculates the actual acceleration Ga based on a value obtained by causing the computed acceleration Ge to pass through the low-pass filter LPF and a value obtained by causing the detected acceleration Gx to pass through the high-pass filter HPF. For example, the actual acceleration calculating unit 102 uses the sum of the two values as the actual acceleration Ga. In this manner, the high-frequency component of the computed acceleration Ge, which has been removed by the low-pass filter LPF, is complemented by a high-frequency component of the detected acceleration Gx, and the low-frequency component of the detected acceleration Gx, which has been removed by the high-pass filter HPF, is complemented by a low-frequency component of the computed acceleration Ge.

As shown in FIG. 2, the target acceleration calculating unit 103 calculates a target acceleration Gt of the vehicle 10 based on the request value Rc of the driver assistance device 60. Specifically, the target acceleration calculating unit 103 calculates the target acceleration Gt based on the request value Rc, which is a longitudinal force, and the mass of the vehicle 10. The target acceleration Gt has a positive value when acceleration of the vehicle 10 is requested. The target acceleration Gt has a negative value when deceleration of the vehicle 10 is requested.

The acceleration deviation calculating unit 104 subtracts the actual acceleration Ga, which is calculated by the actual acceleration calculating unit 102, from the target acceleration Gt, which is calculated by the target acceleration calculating unit 103, thereby calculating a deviation hG between the accelerations.

As shown in FIG. 3, the slope resistance calculating unit 105 calculates a slope resistance Rn of the road surface on which the vehicle 10 is traveling. Specifically, the slope resistance calculating unit 105 executes a longitudinal force calculating process, a rolling resistance calculating process, an air resistance calculating process, and a slope resistance calculating process.

The longitudinal force calculating process obtains a longitudinal force Fq, which is calculated by the longitudinal force controlling unit 107. The longitudinal force Fq includes the request driving force Fdq calculated by the longitudinal force controlling unit 107 and the request braking force Fbq.

The rolling resistance calculating process calculates a rolling resistance Rr acting on the vehicle 10. The rolling resistance calculating process calculates, for example, the product of the weight of the vehicle 10 and the rolling resistance coefficient of the wheel 20 as the rolling resistance Rr. The weight of the vehicle 10 is the product of the mass of the vehicle 10 and the gravitational acceleration. Accordingly, the greater the weight, the greater the rolling resistance Rr becomes. Since the rolling resistance Rr acts in a direction opposite to the traveling direction of the vehicle 10, the rolling resistance Rr has a negative value when the vehicle 10 is advancing.

The air resistance calculating process calculates an air resistance Ra acting on the vehicle 10. The air resistance Ra is calculated based on the vehicle speed Vb, the frontal projected area of the vehicle 10, the density of air, and the air resistance coefficient. For example, the greater the vehicle speed Vb, the greater the air resistance Ra becomes. Since the air resistance Ra acts in a direction opposite to the traveling direction of the vehicle 10, the air resistance Ra has a negative value when the vehicle 10 is advancing.

The slope resistance calculating process calculates the slope resistance Rn based on an equation of motion representing the relationship between forces acting on the vehicle 10 and the acceleration of the vehicle 10. Specifically, the slope resistance Rn is calculated by solving the following relational expression. In the relational expression, m represents the mass of the vehicle 10.

$$Fq+Rn+Rr+Ra=m \cdot Ga$$

The slope resistance Rn is a force that acts on the vehicle 10 due to the gradient of the road surface. In other words, the slope resistance Rn is a component of the weight of the vehicle 10 that acts along the road surface, the weight being the product of the mass of the vehicle 10 and the gravitational acceleration. When the vehicle 10 is advancing on an uphill road, the slope resistance Rn has a negative value. When the vehicle 10 is advancing on a downhill road, the slope resistance Rn has a positive value. In contrast, when the vehicle 10 is reversing on an uphill road, the slope resistance Rn has a positive value. When the vehicle 10 is reversing on a downhill road, the slope resistance Rn has a negative value. Further, the absolute value of the slope resistance Rn increases as the absolute value of the gradient of the road surface relative to a plane orthogonal to the direction of gravitational force increases. When the vehicle 10 traveling on a horizontal road, the slope resistance Rn is 0.

As shown in FIG. 2, the correction unit 106 includes a feedback correction unit 111, a feedforward correction unit 112, and a converting unit 113.

The feedback correction unit 111 calculates a feedback correction amount Si for reducing the deviation hG. That is, the feedback correction amount Si is calculated through a feedback control that uses the deviation hG as an input. The feedback control includes, for example, a proportional control and an integral control. In this case, the feedback correction amount Si is obtained by adding the product of a proportional gain and the deviation hG to the product of an integral gain and the time integral of the deviation hG. The feedback control may include a derivative control.

The converting unit 113 converts the feedback correction amount Si, which has been calculated by the feedback correction unit 111, into the same dimension as the request value Rc. In the present embodiment, the converting unit 113 converts the feedback correction amount Si, which is in the dimension of acceleration, into a feedback control amount in the dimension of longitudinal force. In the following description, the feedback correction amount after the conversion will be referred to as a feedback correction amount Rh. The feedback correction amount Rh is added to the request value Rc so as to correct the request value Rc.

The feedforward correction unit 112 calculates a feedforward correction amount Rf, which corresponds to the slope resistance Rn. The feedforward correction amount Rf is added to the request value Rc so as to correct the request value Rc. The feedforward correction amount Rf is thus in the same dimension as the request value Rc.

The feedforward correction unit 112 determines whether the road surface on which the vehicle 10 is traveling is an uphill road or a downhill road based on the magnitude of the slope resistance Rn. The feedforward correction unit 112 determines that the vehicle 10 is traveling on an uphill road if the slope resistance Rn is less than an uphill determination value Rn1. The uphill determination value Rn1 is a reference for determining whether the road surface is an uphill road by using the slope resistance Rn. The uphill determination value Rn1 is set to 0 or a value slightly less than 0. The feedforward correction unit 112 also determines that the vehicle 10 is traveling on a downhill road if the slope resistance Rn is greater than a downhill determination value Rn2. The downhill determination value Rn2 is a reference for determining whether the road surface is a downhill road by using the slope resistance Rn. The downhill determination value Rn2 is set to 0 or a value slightly greater than 0.

The feedforward correction unit 112 executes a first correction process when the vehicle 10 is traveling on an uphill road. In the first correction process, the feedforward correction unit 112 sets the feedforward correction amount Rf to a positive value. The feedforward correction unit 112 increases the feedforward correction amount Rf as the gradient of the uphill road increases, that is, as the slope resistance Rn increases. The feedforward correction amount Rf is added to the request value Rc, so that the request value Rc is increased. If the request value Rc is increased during acceleration of the vehicle 10, the acceleration of the vehicle 10 increases. If the request value Rc is increased during deceleration of the vehicle 10, the acceleration of the vehicle 10 decreases. Thus, when the first correction process is executed, the traveling speed of the vehicle 10 is higher than that in a case in which the first correction process is not executed.

On the other hand, the feedforward correction unit 112 executes a second correction process when the vehicle 10 is traveling on a downhill road. In the second correction process, the feedforward correction unit 112 sets the feedforward correction amount Rf to a negative value. The feedforward correction unit 112 decreases the feedforward correction amount Rf as the gradient of the downhill road increases, that is, as the slope resistance Rn decreases. The feedforward correction amount Rf is added to the request value Rc, so that the request value Rc is reduced. If the request value Rc is reduced during acceleration of the vehicle 10, the acceleration of the vehicle 10 decreases. If the request value Rc is reduced during deceleration of the vehicle 10, the deceleration of the vehicle 10 increases. That is, when the second correction process is executed, the traveling speed of the vehicle 10 is lower than that in a case in which the second correction process is not executed.

The first correction process and the second correction process can be regarded as the same process in that both processes add, to the request value Rc, the feedforward correction amount Rf that corresponds to the slope resistance Rn. The difference between the first correction process and the second correction process is that the signs of the feedforward correction amount Rf, which is added to the request value Rc, are opposite to each other.

When the first correction process and the second correction process are executed, the absolute value of the feedforward correction amount Rf increases as the absolute value of the gradient of the road surface on which the vehicle 10 is traveling increases. In order to associate the absolute value of the feedforward correction amount Rf to the absolute value of the gradient of the road surface on which the vehicle 10 is traveling as described above, the feedforward correction unit 112 preferably sets the feedforward correction amount Rf to a value obtained by reversing the sign of the slope resistance Rn.

Thus, when the vehicle 10 is traveling on an uphill road, in other words, when the slope resistance Rn acts as a force that decelerates the vehicle 10, the feedforward correction amount Rf is a force that accelerates the vehicle 10. Likewise, when the vehicle 10 is traveling on a downhill road, in other words, when the slope resistance Rn acts as a force that accelerates the vehicle 10, the feedforward correction amount Rf is a force that decelerates the vehicle 10. The feedforward correction amount Rf can thus be regarded as a force that cancels the slope resistance Rn.

When executing a driver assistance function that automatically adjusts the vehicle speed Vb such as an autonomous driving control, the driver assistance device 60 executes a driver assistance function that requires a hard braking if another vehicle cut in front of the vehicle 10. The driver assistance device 60 then outputs the request value Rc that requests hard braking to the travel controller 100. In this case, the request value Rc has a negative value of which the absolute value is large. When the driver assistance function that requires hard braking is executed, the vehicle 10 is preferably stopped promptly. However, if the feedforward correction amount Rf is set to a positive value simply because the vehicle 10 is traveling on an uphill road, the force that decelerates the vehicle 10 will be reduced. Thus, if hard braking of the vehicle 10 is requested when the vehicle 10 is traveling on an uphill road, the feedforward correction amount Rf is preferably reduced.

In this regard, if hard braking of the vehicle 10 is requested by the driver assistance device 60 when the first correction process is being executed, the feedforward correction unit 112 sets the feedforward correction amount Rf to a lower value than that in a case in which hard braking of the vehicle 10 is not requested. This reduces the correction amount of the request value Rc based on the feedforward correction amount Rf in the first correction process. In the present embodiment, even if the first correction process is being executed, the feedforward correction unit 112 sets the feedforward correction amount Rf to 0 when hard braking of the vehicle 10 is requested.

The feedforward correction unit 112 determines whether hard braking of the vehicle 10 is requested based on whether the request value Rc is less than a hard braking request value Rchb. The hard braking request value Rchb is a negative value and corresponds the magnitude of the braking force Fb applied to the vehicle 10 at hard braking of the vehicle 10. The value of the braking force Fb that corresponds to the hard braking request value Rchb is defined as the specified determination value. When the request value Rc is less than the hard braking request value Rchb, the request braking force Fbq that the driver assistance device 60 requests the travel controller 100 to produce will exceed the specified determination value.

In contrast, when the vehicle 10 is traveling on a downhill road, the feedforward correction amount Rf has a negative value. Thus, when the vehicle 10 is traveling on a downhill road, the feedforward correction unit 112 does not perform correction of the feedforward correction amount Rf based on a request for hard braking of the vehicle 10.

The longitudinal force controlling unit 107 controls the driving device 40 and the braking device 50 based on the sum of the request value Rc, the feedback correction amount Rh, and the feedforward correction amount Rf (the sum will also be referred to as a corrected request value Rt). For example, when the corrected request value Rt has a positive value, the longitudinal force controlling unit 107 requests the driving device 40 to generate the request driving force Fdq that corresponds to the magnitude of the corrected request value Rt. In this case, the driving force Fd that corresponds to the request driving force Fdq is applied to the vehicle 10. In contrast, when the corrected request value Rt has a negative value, the longitudinal force controlling unit 107 requests the braking device 50 to generate the request braking force Fbq that corresponds to the magnitude of the corrected request value Rt. In this case, the frictional braking force Fbf that corresponds to the request braking force Fbq is applied to the vehicle 10.

As described above, the slope resistance calculating unit 105 calculates the slope resistance Rn using the request driving force Fdq and the request braking force Fbq, which are calculated by the longitudinal force controlling unit 107. However, due to the responsiveness of the motor-generator 41, the request driving force Fdq at the calculation of the slope resistance Rn may be deviated from the driving force Fd applied to the vehicle 10 by the motor-generator 41. Likewise, due to the responsiveness of the brake actuator 51, the request braking force Fbq at the calculation of the slope resistance Rn may be deviated from the frictional braking force Fbf applied to the vehicle 10 by the brake actuator 51. In this regard, the slope resistance calculating unit 105 preferably takes the responsiveness of the motor-generator 41 and the brake actuator 51 into consideration when calculating the slope resistance Rn. For example, the slope resistance calculating unit 105 preferably calculates the slope resistance Rn based on values obtained through a gradual change process such as a primary delay process executed on the request driving force Fdq and the request braking force Fbq, which are calculated by the longitudinal force controlling unit 107.

The slope resistance calculating unit 105 is also capable of calculating the slope resistance Rn without using the request driving force Fdq and the request braking force Fbq. For example, if the hydraulic pressure of the wheel cylinder 33 is detectable, the slope resistance calculating unit 105 may obtain the braking force Fb acting on the vehicle 10 based on the hydraulic pressure of the wheel cylinder 33. The slope resistance calculating unit 105 may also calculate the slope resistance Rn using the obtained braking force Fb, instead of the request braking force Fbq. If the current value through the motor-generator 41 is detectable, the slope resistance calculating unit 105 may obtain the driving force Fd acting on the vehicle 10 based on the current value. The slope resistance calculating unit 105 may also calculate the slope resistance Rn using the obtained driving force Fd, instead of the request driving force Fdq.

Next, with reference to the flowchart shown in FIG. 4, the flow of a process executed by the feedforward correction unit 112 when calculating the feedforward correction amount Rf will be described. This process is executed at predetermined control cycles while the vehicle 10 is traveling.

Figure 4:
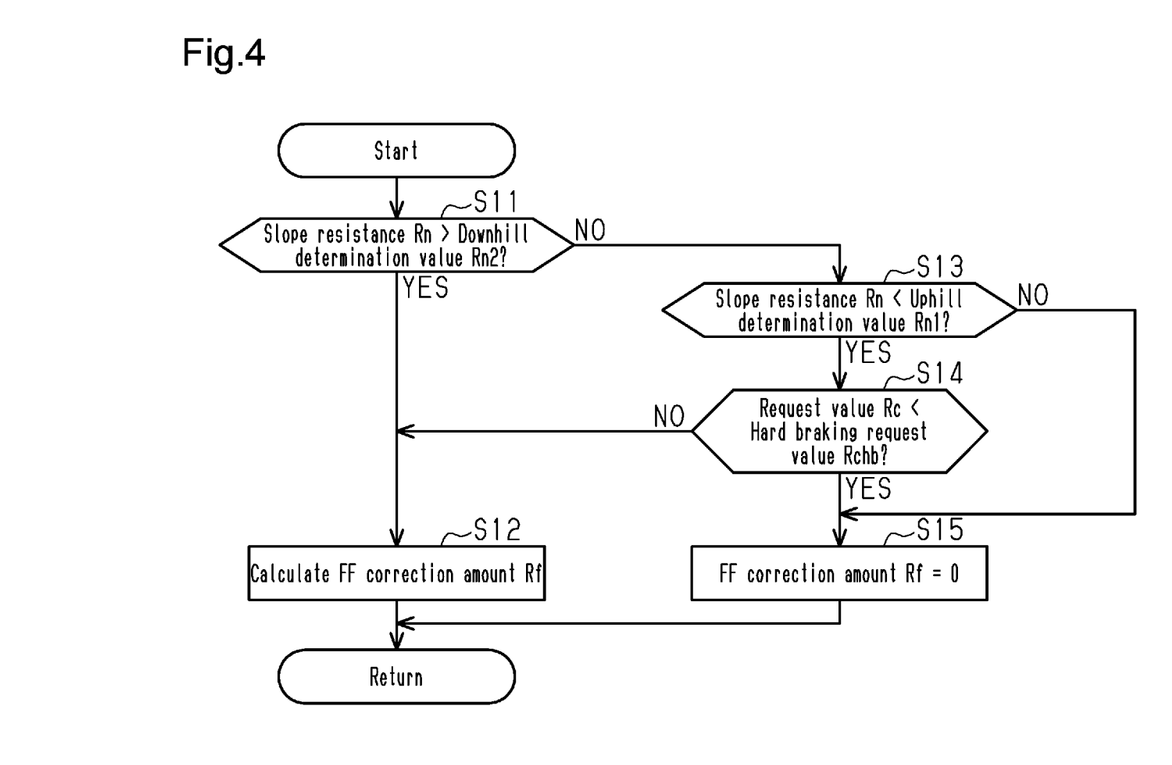
FIG. 4 is a flowchart showing a procedure of processes executed by a feedforward correction unit of the travel controller shown in FIG. 2.

As shown in FIG. 4, the feedforward correction unit 112 determines whether the slope resistance Rn, which is calculated by the slope resistance calculating unit 105, is greater than the downhill determination value Rn2 (S11). If the slope resistance Rn is greater than the downhill determination value Rn2 (S11: YES), in other words, if the vehicle 10 is traveling on a downhill road, the feedforward correction unit 112 calculates the feedforward correction amount Rf that corresponds to the slope resistance Rn (S12). Thereafter, the feedforward correction unit 112 ends the present process.

If the slope resistance Rn is less than or equal to the downhill determination value Rn2 in step S11, the feedforward correction amount Rf determines whether the slope resistance Rn is less than the uphill determination value Rn1 (S13). If the slope resistance Rn is less than the uphill determination value Rn1 (S13: YES), the feedforward correction unit 112 determines whether the request value Rc is less than the hard braking request value Rchb (S14). If the request value Rc is greater than or equal to the hard braking request value Rchb (S14: NO), in other words, if the driver assistance device 60 is not requesting hard braking of the vehicle 10, the feedforward correction unit 112 advances the process to step S12. In this case, the feedforward correction amount Rf that corresponds to the slope resistance Rn is calculated.

If the request value Rc is less than the hard braking request value Rchb in step S14 (S14: YES), in other words, if the driver assistance device 60 is requesting hard braking of the vehicle 10, the feedforward correction unit 112 sets the feedforward correction amount Rf to 0 (S15). Thereafter, the feedforward correction unit 112 ends the present process. If the slope resistance Rn is greater than or equal to the uphill determination value Rn1 in step S13 (S13: NO), that is, if the vehicle 10 is traveling on a horizontal road surface, the feedforward correction unit 112 advances the process to step S15. In this case, since the vehicle 10 is not traveling on a slope, the feedforward correction amount Rf is set to 0.

Operation and Advantages of Present Embodiment

When the vehicle 10 is traveling on an uphill road and when the vehicle 10 is traveling on a downhill road, the request value Rc is corrected in the first correction process and the second correction process based on the feedforward correction amount Rf that corresponds to the slope resistance Rn. Specifically, when the vehicle 10 is traveling on an uphill road, the feedforward correction amount Rf has a value greater than 0. If the vehicle 10 is traveling on a downhill road, the feedforward correction amount Rf has a value less than 0. That is, when the vehicle 10 is traveling on an uphill road, the request value Rc is increased by the first correction process, so that the corrected request value Rt is calculated. In contrast, when the vehicle 10 is traveling on a downhill road, the request value Rc is reduced by the second correction process in order to calculate the corrected request value Rt. Since the driving device 40 and the braking device 50 operate based on the corrected request value Rt, the actual acceleration Ga of the vehicle 10 is prevented from deviating from the target acceleration Gt, which corresponds to request value Rc of the driver assistance device 60.

However, even when the vehicle 10 is traveling on an uphill road, the feedforward correction amount Rf used in the first correction process is set to 0 if the driver assistance device 60 is requesting hard braking of the vehicle 10. That is, the correction amount of the request value Rc in the first correction process is less than that in a case in which hard braking is not requested. In this case, as forces that decelerate the vehicle 10, the braking force Fb and the slope resistance Rn that correspond to the request value Rc act on the vehicle 10. In other words, the force that decelerates the vehicle 10 is increased by the amount corresponding to the reduction in the feedforward correction amount Rf. This readily stops the vehicle 10.

When the vehicle 10 is traveling on a downhill road, the feedforward correction amount Rf is not set to 0 even if the driver assistance device 60 is requesting hard braking of the vehicle 10. This readily stops the vehicle 10 while allowing the actual acceleration Ga to follow the target acceleration Gt.

<Modifications>

The above-described embodiment may be modified as follows. The above-described embodiment and the following modifications can be combined as long as the combined modifications remain technically consistent with each other.

Figure 5:
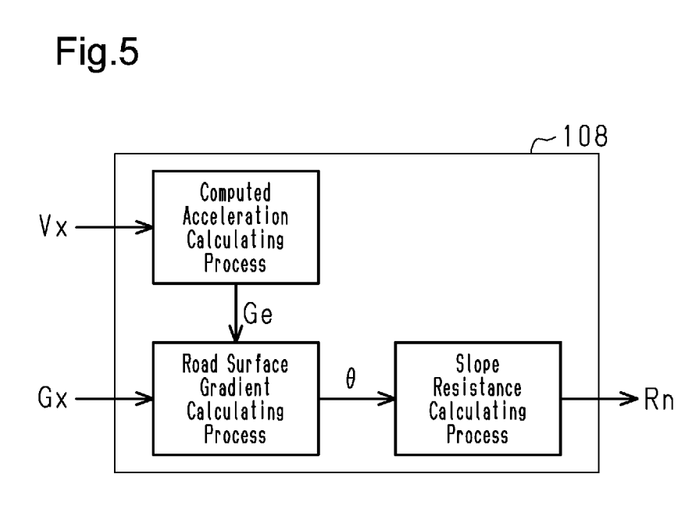
FIG. 5 is a block diagram of a slope resistance calculating unit of the travel controller according to a modification.

The travel controller 100 may include a slope resistance calculating unit 108 shown in FIG. 5 in place of the slope resistance calculating unit 105 shown in FIG. 2. The slope resistance calculating unit 108 executes a computed acceleration calculating process, a road surface gradient calculating process, and a slope resistance calculating process, thereby calculating the slope resistance Rn. Like the actual acceleration calculating unit 102 in the above-described embodiment, the computed acceleration calculating process calculates the computed acceleration Ge. The road surface gradient calculating process calculates the gradient of the road surface on which the vehicle 10 is traveling (hereinafter, also referred to as a road surface gradient θ) based on the computed acceleration Ge and the detected acceleration Gx. The road surface gradient θ has a positive value in a case of an upward gradient, and has a negative value in a case of a downward gradient. The slope resistance calculating process calculates the slope resistance Rn based on the mass of the vehicle 10, the gravitational acceleration, and the road surface gradient θ.

When the vehicle 10 is traveling on an uphill road, the feedforward correction unit 112 may set the feedforward correction amount Rf to a constant value regardless of the magnitude of the gradient of the uphill road. Also, when the vehicle 10 is traveling on an uphill road, the feedforward correction unit 112 may set the feedforward correction amount Rf to a value that changes in a stepwise manner in accordance with the magnitude of the gradient of the uphill road. The same applies to a case in which the vehicle 10 is traveling on a downhill road.

The feedforward correction unit 112 may calculate the feedforward correction amount Rf by reversing the sign of the slope resistance Rn and multiplying the resultant by a coefficient, the coefficient being a value between 0 and 1, inclusive. In this case, the feedforward correction unit 112 preferably sets the coefficient to a lower value in a case in which hard braking is requested than that in a case in which hard braking is not requested. As an example, the feedforward correction unit 112 may set the coefficient to 0.1 in a case in which hard braking is requested, so that the feedforward correction amount Rf will be one tenth of the original value.

The request value Rc of the driver assistance device 60 may be modified as long as it is a value that correlates with the longitudinal force. For example, the request value Rc of the driver assistance device 60 may be an acceleration. In this case, the travel controller 100 does not need to calculate the target acceleration Gt and thus does not need to include the target acceleration calculating unit 103. Also, the travel controller 100 does not need to convert the dimension of the feedback correction amount Si and thus does not need to include the converting unit 113.

The driver assistance device 60 may be divided into a device that executes an autonomous driving control and a device that executes an emergency braking control. In this case, the travel controller 100 may determine whether hard braking of the vehicle 10 is requested based on whether a signal requesting hard braking has been delivered from the device that executes the emergency braking control.

The driving device 40 may include an internal combustion engine. In this case, the slope resistance calculating unit 105 may obtain the driving force Fd acting on the vehicle 10 based on a throttle opening degree and an engine rotation speed. The slope resistance calculating unit 105 may calculate the slope resistance Rn using the driving force Fd.

The motor-generator 41 may apply, to the wheels 20, a regenerative braking force Fbr, which decelerates the vehicle 10. In this case, the travel controller 100 preferably controls the driving device 40 and the braking device 50 such that the sum of the regenerative braking force Fbr and the frictional braking force Fbf becomes the request braking force Fbq.

The braking device 50 may be an electro-mechanical brake (EMB).

The number of the wheels 20 of the vehicle 10 may be changed. For example, the vehicle 10 may be a two-wheel vehicle or a four-wheel vehicle.

The travel controller 100 is not limited to processing circuitry that includes a CPU and a ROM and executes software processing. For example, the travel controller 100 may include a dedicated hardware circuit that executes at least part of the processes executed in the above-described embodiment. The dedicated hardware circuits include, for example, an application specific integrated circuit (ASIC). That is, the travel controller 100 may be modified as long as it has any one of the following configurations (a) to (c).

(a) Processing circuitry including a processor that executes all of the above-described processes according to programs and a program storage device such as a ROM that stores the programs.

(b) Processing circuitry including a processor and a program storage device that execute part of the above-described processes according to the programs and a dedicated hardware circuit that executes the remaining processes.

(c) Processing circuitry including a dedicated hardware circuit that executes all of the above-described processes.

Multiple software processing devices each including a processor and a program storage device and multiple dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller that automatically controls a traveling speed of a vehicle based on a request value provided by a driver assistance device, wherein the vehicle controller comprises a correction unit, when the vehicle is traveling on an uphill road, the correction unit executes a first correction process on the request value, the first correction process being a process that corrects the request value such that the traveling speed is higher than that in a case in which the first correction process is not executed, when the vehicle is traveling on a downhill road, the correction unit executes a second correction process on the request value, the second correction process being a process that corrects the request value such that the traveling speed is lower than that in a case in which the second correction process is not executed, if hard braking of the vehicle is requested by the driver assistance device when the vehicle is traveling on the uphill road and the first correction process is being executed, the correction unit sets a correction amount of the request value in the first correction process to a lower value than that in a case in which hard braking of the vehicle is not requested, thereby increasing a force that decelerates the vehicle, and if hard braking of the vehicle is requested by the driver assistance device when the vehicle is traveling on the downhill road and the second correction process is being executed, the correction unit refrains from making a correction amount of the request value in the second correction process lower than that in a case in which hard braking of the vehicle is not requested.

2. The vehicle controller according to claim 1, further comprising a slope resistance calculating unit that calculates a slope resistance that corresponds to a gradient of a road surface on which the vehicle is traveling, wherein
   the correction unit includes a feedforward correction unit,
   the feedforward correction unit calculates a feedforward correction amount that corresponds to the slope resistance, and executes the first correction process and the second correction process using the feedforward correction amount, and
   if hard braking of the vehicle is requested by the driver assistance device when the first correction process is being executed, the feedforward correction unit sets a correction amount of the request value based on the feedforward correction amount in the first correction process to a lower value than that in a case in which hard braking of the vehicle is not requested.

3. The vehicle controller according to claim 2, wherein
   the slope resistance calculating unit calculates the slope resistance based on a relational expression between a longitudinal force acting on the vehicle and an actual acceleration of the vehicle, and
   the longitudinal force includes a driving force that accelerates the vehicle, a braking force that decelerates the vehicle, and the slope resistance.

4. The vehicle controller according to claim 3, wherein the longitudinal force further includes at least one of an air resistance that acts on the vehicle and a rolling resistance of a wheel of the vehicle.

\* \* \* \* \*